F. V. DETWILER.
COOKER.
APPLICATION FILED JAN. 26, 1910.
1,106,634.
Patented Aug. 11, 1914.
3 SHEETS—SHEET 1.
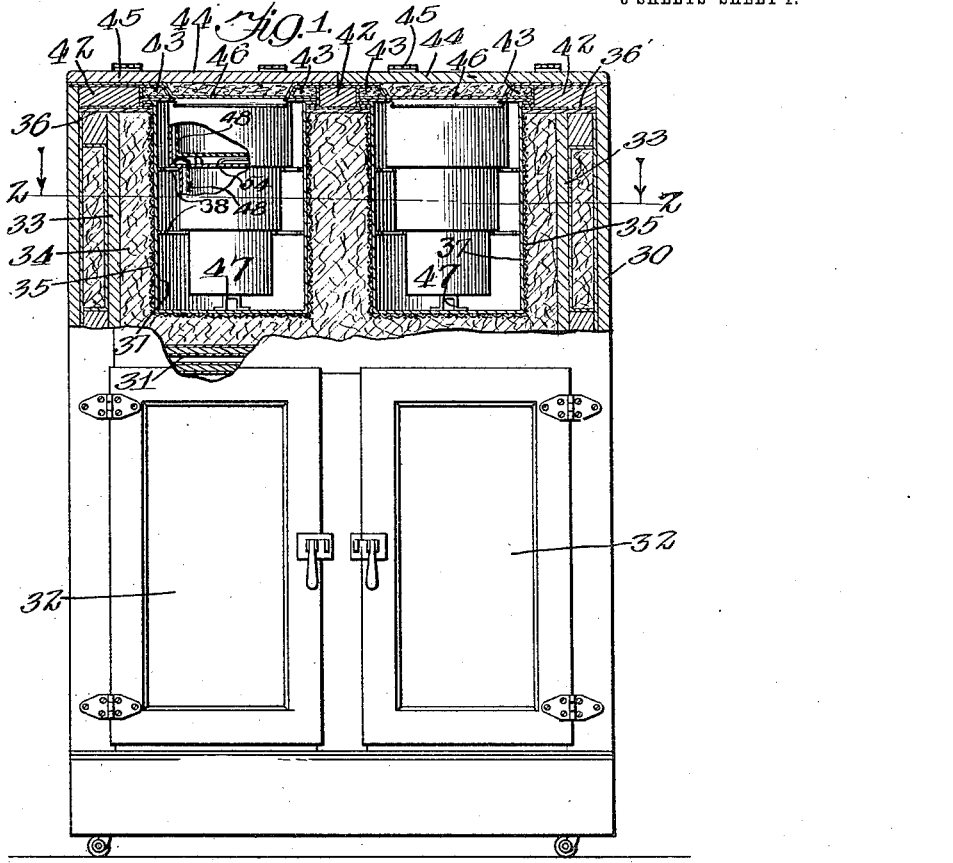
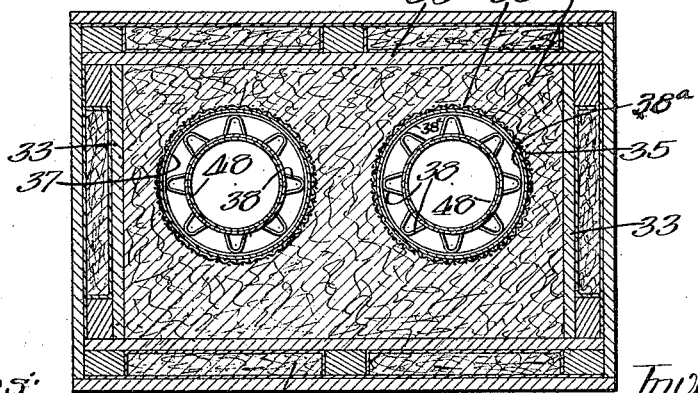

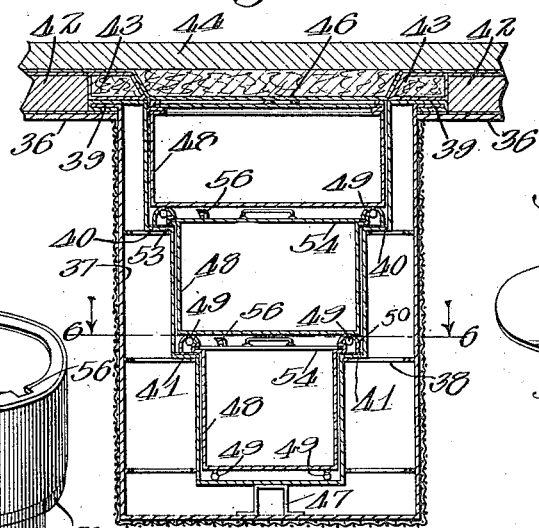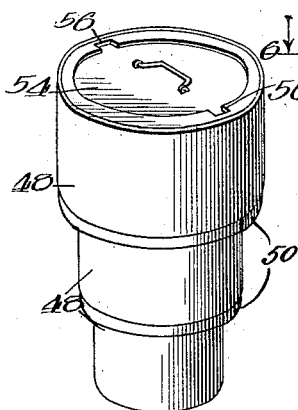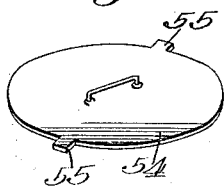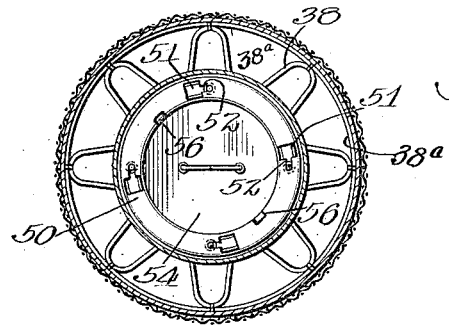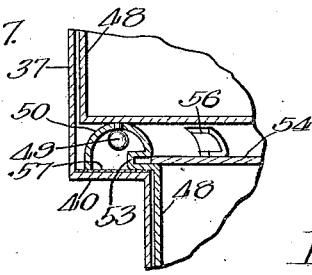

F. V. DETWILER.
COOKER.
APPLICATION FILED JAN. 26, 1910.
1,106,634.
Patented Aug. 11, 1914.
3 SHEETS—SHEET 3.
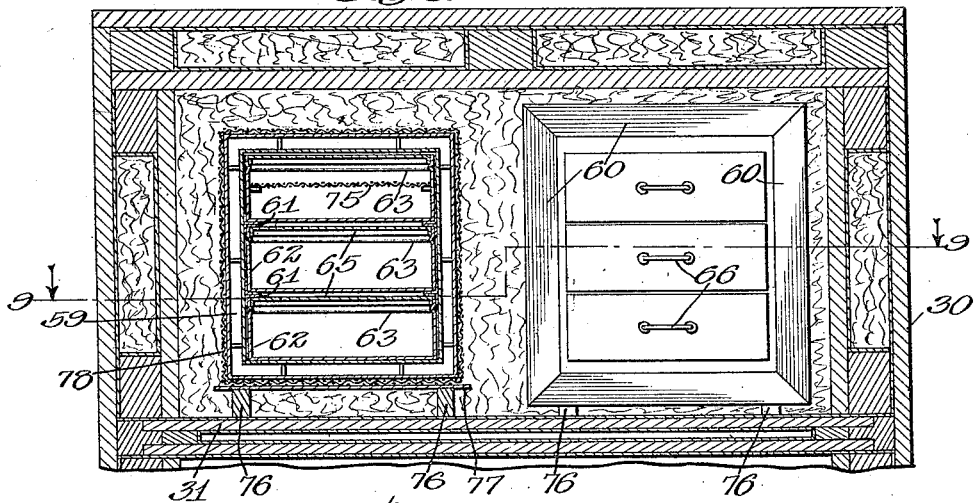
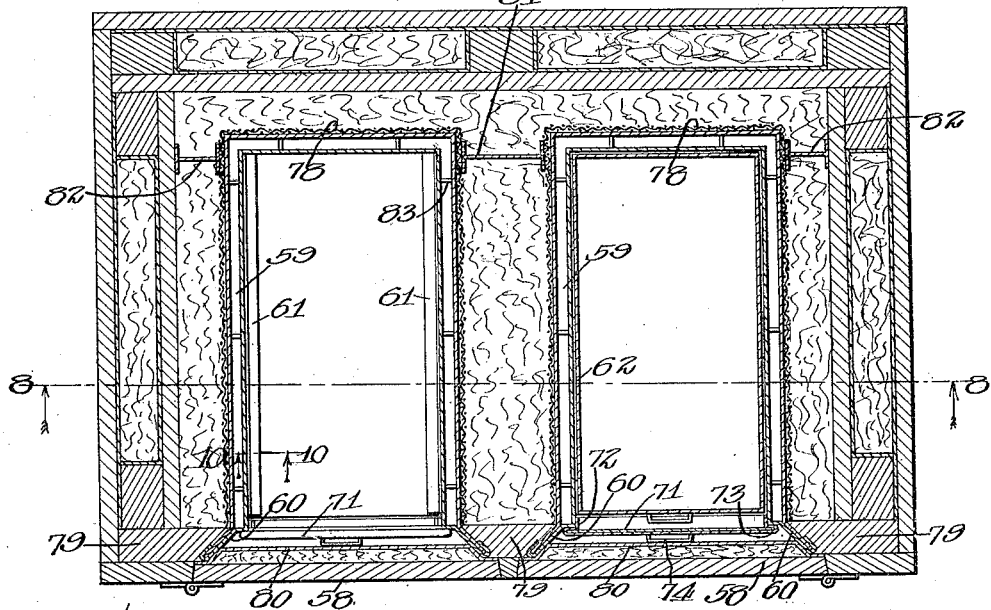
Witnesses:
Inventor:
Forest V. Detwiler
By Brown & Hopkins
Att'ys

UNITED STATES PATENT OFFICE.

FOREST V. DETWILER, OF CHICAGO, ILLINOIS.

COOKER.

1,106,634.

Specification of Letters Patent.

Patented Aug. 11, 1914.

Original application filed May 28, 1909, Serial No. 498,797. Divided and this application filed January 26, 1910. Serial No. 540,164.

*To all whom it may concern:*

Be it known that I, FOREST V. DETWILER, a citizen of the United States, residing at Chicago, in the county of Cook and State of Illinois, have invented certain new and useful Improvements in Cookers, of which the following is a specification.

This invention relates to improvements in cookers or heat retaining apparatus and more particularly to that type commonly known as fireless cookers, which comprise a hollow receptacle insulated from contact with the surrounding atmosphere by a suitable heat-non-conducting material and adapted to contain cooking vessels, into which have been placed materials to be cooked. The vessels after having been heated are placed within the receptacle, which is then sealed up and the cooking operation will then proceed slowly but steadily with the heat already generated, owing to the fact that it is retained within the receptacle and not dissipated.

A further object is to provide an improved cooker of this character arranged within a casing and so constructed that all of the parts may be separated and readily removed from the casing.

A further object is to provide an improved means for securing a plurality of vessels together whereby they may be simultaneously placed within and removed from the cooking receptacles.

A further object is to provide an improved device of this character which will be simple, durable and cheap in construction and effective and efficient in operation.

To the attainment of these ends and the accomplishment of other new and useful objects as will appear, the invention consists in the features of novelty in the construction, combination and arrangement of the several parts hereinafter more fully described and claimed and shown in the accompanying drawings illustrating the embodiment of the invention, and in which—

Figure 1 is a view partly in elevation and partly in section of a casing showing an improved construction of cooker therein constructed in accordance with the principles of this invention. Fig. 2 is a detail sectional view on line 2—2 of Fig. 1. Fig. 3 is an enlarged detail sectional view through one of the cooking receptacles, showing the vessels within the receptacles and in section. Fig. 4 is a detail perspective view of a series of cooking vessels secured together for use. Fig. 5 is a detail perspective view of one of the covers or lids for the cooking vessels. Fig. 6 is an enlarged detail sectional view on line 6—6 of Fig. 3. Fig. 7 is an enlarged detail sectional view partly in perspective, showing the manner of fastening or securing two of the cooking vessels together. Fig. 8 is a detail sectional view on line 8—8 of Fig. 9, the front of one of the receptacles being shown in elevation. Fig. 9 is a sectional view on line 9—9 of Fig. 8. Fig. 10 is an enlarged detail sectional view on line 10—10 of Fig. 9.

This application is a division of application Serial No. 498,797, filed by me in the United States Patent Office May 28, 1909.

Referring more particularly to the drawings and in the present exemplification of the invention, the numeral 30 designates generally a casing which may be constructed of any desired material and may be of any desired size and configuration. In the present exemplification of the invention this casing is shown as divided by means of a partition 31 into an upper and a lower compartment. This partition 31 is so constructed that the two compartments will be insulated from each other, and the lower casing may be provided with doors or closures 32, through which access may be had to the compartment.

The upper compartment is provided with inner walls 33, which are removably held in position in any desired or suitable manner, and these walls terminate short of the top of the compartment. When the inner walls of the top compartment are placed in position a suitable quantity of heat-non-conducting material 34, such as asbestos, mineral wool, or the like, is placed within the compartment, and frames 35 constructed of perforate material, such as wire gauze or the like, are embedded in the heat-non-conducting material. When the material has been suitably packed to a point substantially flush with the upper edges of the inner walls of the compartment, a board or member 36 is placed within the compartment so as to rest upon the top edges of the inner walls 33. If desired this board or member 36 may be covered or faced with suitable metal 36', such as zinc or the like, although if desired, this covering may be omitted.

The board or member is provided with apertures therethrough, through which the cooking receptacles 37 are adapted to project. The edges of the perforate material 35 are then located below the edges of the member 36, as shown more clearly in Fig. 3, so that when the cooking vessels 37 are removed the perforate material will remain within the compartment to form casings into which the vessels may again be inserted.

The vessels may be constructed in the ordinary and well known manner so as to have an inner and an outer wall to form a hermetically sealed space therebetween and from which space the air has been exhausted.

In order to prevent the walls of the vessel from collapsing under atmospheric pressure, after the air has been exhausted, a suitable brace 38, shown more clearly in Figs. 3 and 6, is provided, which is located within the space between the walls, and any number of these braces may be used at intervals throughout the height of the receptacle and spaced from each other and the outer portions of the braces may be connected by a member 38ª.

The receptacle is preferably constructed with a peripheral radially projecting flange 39 around the upper edge thereof, which flange is adapted to rest upon the member 36 to suspend the receptacle, and the inner wall of the receptacle is preferably so constructed as to be of varying diameters throughout its length to form offset portions or seats 40, 41.

When the receptacle is placed in position within the compartment, the member 36 is held against displacement by means of suitable beams or members 42, which rest upon the member 36 and are secured in position in any desired or suitable manner. One of these members 42 is arranged between the openings in the member 36 and all of the members terminate short of the openings to form shoulders upon which the flanges 39 of the receptacles rest. Suitable filler members 43 which are preferably tubular in construction and filled with heat-non-conducting material, such as mineral wool, asbestos or the like, are provided, which rest upon the flange 39 to fill the spaces between the adjacent edges of the members 42 and the openings in the receptacles.

The compartment may be closed in any desired or suitable manner, preferably by means of covers or closures 44, which are hinged as at 45, whereby the covers may be swung open or closed, and one of these cover sections is provided for each of the receptacles 37. Secured to the respective cover sections is a metallic casing 46, which is spaced from the cover and the space filled with heat-non-conducting material. This casing projects beyond the cover sections 44 and is of a configuration to conform to the opening in the filler member 43, so that when the cover 44 is closed this portion will project into the opening in the filler member to form a closure for the receptacle and also to insulate the opening from the cover.

If desired, the inner wall of the receptacle 37 may be supported at its base by means of a suitable support 47. The bracing members 38 are preferably arranged adjacent the offset portions or seats 40, 41, and may be secured against displacement in any desired or suitable manner.

In the exemplification of the invention shown in Figs. 1 and 3, the receptacle 37 is divided into three compartments, which are of varying diameters, the compartment having the smaller diameter being located at the bottom of the vessel 37, while the compartment having the larger diameter is located at the top, so that the vessels may be placed within the receptacle so as to support each other.

The vessels designated generally by the reference numeral 48, are of a diameter to respectively and substantially fill each of the compartments, and each of the vessels is provided with feet 49.

The top of the two lowermost receptacles is curved upwardly and outwardly as at 50, so that the under edge thereof will engage and rest upon the offset portions or seats 40, 41. These curved portions 50 are provided with apertures 51 (see Fig. 6), having reduced portions 52. The apertures 51 are of a size to receive the legs 49 of the next adjacent vessel and when the legs are inserted in the apertures, one of the vessels may be axially rotated with respect to the other to cause the shanks of the legs to enter the reduced portions 52 of the apertures to lock the vessels together.

The apertures in the portions 50 of the vessels may be disposed in such directions with relation to each other that when one vessel is rotated to lock one vessel to another, a third vessel will not become accidentally detached from the adjacent vessel.

The upper edge of the vessels is offset as at 53 (see Fig. 7) to form a shoulder for the cover 54. This cover is provided with ears or projections 55 on its periphery, which are adapted to enter suitable apertures or openings 56 in the curved portions 50 of the vessels, so that the periphery of the cover will be seated on the shoulder formed by the offset portion 53. When thus placed in position, the cover may be axially rotated so that the ears or projections 55 will pass under the overhanging portion of the top of the vessel to lock the cover against displacement. The vessels thus secured together may, after the materials have been placed therein and heated ready for cooking, be inserted into the receptacles 37, and when the cover 44 is closed to confine the heat, the cooking of the materials will then proceed. If desired, one or more of the vessels 48 may be omitted without interfering with the successful operation of the cooker.

If desired, strips of heat-non-conducting material 57, such as asbestos or the like, may be provided and placed upon the offset portions 40, 41, and upon which the upper edges of the cooking vessels rest.

In the form of the invention shown in Figs. 8 to 12, the upper part of the casing 30 in which is located the cooker is provided with doors 58, which open through the front of the casing, as shown more clearly in Fig. 9. The cooker or receptacle 59 in this form of the invention is preferably of a rectangular configuration with the front side thereof open. The edges 60 of the receptacle which surrounds the opening are deflected, as shown more clearly in Fig. 9, to form an opening which increases gradually in diameter toward the outer edges thereof.

Supports 61 for the vessels 62 are provided and are secured within the receptacles 59, and the front edges of these supports 61 terminate short of the front of the receptacle, as shown more clearly in Figs. 9 and 12. These vessels 62 are also rectangular in configuration, and are preferably constructed with a beaded or offset portion 63 adjacent the top thereof and against which beaded portion the flange 64 of the cover 65 is adapted to rest, shown more clearly in Fig. 10. The front of the vessels 62 is provided with handles 66, by means of which the vessel may be readily removed from and inserted within the receptacle 59.

Suitable closures 71 in the form of a cover are provided for closing the openings in the receptacles. These covers are preferably constructed with a flange 72 adapted to be inserted into the receptacle to frictionally hold the cover in position, and a peripheral flange 73 is also formed on the cover which rests against the outer edges of the receptacle. A piece of asbestos or other heat-non-conducting material may be secured to the cover 71 for thoroughly insulating the same, and a handle 74 may be provided for readily removing these covers.

The vessels 62 may be divided into two or more compartments by means of a removable partition 75, which is adapted to engage and rest upon suitable supports within the vessel 62. In this exemplification of the invention the receptacles 59 may be supported by means of beams or members 76, which rest upon the partition 31, and these members 76 are secured against displacement in any desired or suitable manner.

If desired, a strip of asbestos or other suitable heat-non-conducting material 77 may be placed between the supports 76 and the casings 78 formed by the reticulated material and into which the receptacles are inserted. In this exemplification of the invention and when it is desired to gain access to the receptacles 59 the doors 58 may be opened, and when it is desired to bodily remove the receptacles from the compartment, they may be readily removed by drawing them through the door openings. When in position the front edges of the flanges 60 stand flush with the outer faces of the stiles 79, against which latter the doors 58 rest when closed. The doors 58 are provided with projecting casings 80 which are filled with heat-non-conducting material, and are similar to the casings 46 on the closures 44 and are adapted to form closures for the open faces of the receptacles 59.

When it is desired to bodily remove the receptacles 37 in the exemplification of the invention shown in Figs. 1 and 3, the filler rings 43 are first removed after the covers 44 have been opened, and when removed the receptacles may be bodily lifted out of the casing.

With this improved construction it will be apparent that all of the parts may be readily removed from the casing as well as the inner walls of the casing, and may as readily be replaced.

In the form of the invention shown in Figs. 8 and 9, the rear ends of the receptacles 59 may be steadied and held in position by means of guides 81, 82, the guides 82 being disposed between the walls of the outer casings and the receptacle and the guide 81 being disposed between the adjacent portions of the receptacles. The spaced walls may also be braced against collapse under atmospheric pressure by means of the bracing or spacing members 83.

Having thus described the invention, what is claimed as new is:

1. A fireless cooker comprising an inclosing casing, a frame arranged in the casing, heat non-conducting material between the frame and the casing, a receptacle removably disposed within the frame and substantially filling the frame, said receptacle having hollow walls from between which the air has been exhausted, independent supports within the receptacle for supporting a plurality of vessels from the inner walls of the receptacle, and one above the other, and a closure for the receptacle and casing.

2. A fireless cooker comprising an inclosing casing, a frame constructed of apertured material arranged in the casing, heat non-conducting material between the frame and the casing, a receptacle removably disposed within the frame and substantially filling the frame, said receptacle having hollow walls from between which the air has been exhausted, independent supports within the receptacle for supporting a plurality of vessels of different sizes from the inner walls of the receptacle, and one above the other, and a closure for the receptacle and casing.

3. A fireless cooker comprising an inclosing casing, a frame arranged in the casing, heat non-conducting material between the frame and the casing, a receptacle removably disposed within the frame and substantially filling the frame, said receptacle having hollow walls from between which the air has been exhausted, independent supports within the receptacle for supporting a plurality of vessels from the inner walls of the receptacle, and one above the other, interlocking means on adjacent vessels for detachably securing them together for simultaneous insertion and removal, and a closure for the receptacle and casing.

4. A fireless cooker comprising a casing, a removable receptacle within the casing, heat non-conducting material between the receptacle and the casing, said receptacle being provided with a circumferential flange, a shoulder adapted to be engaged by the flange for holding the receptacle in position, said flange and shoulder being located entirely within the casing, and a closure for the casing and receptacle.

5. A fireless cooker comprising a casing, a removable receptacle within the casing, heat-non-conducting material between the receptacle and the casing, said receptacle being provided with a circumferential flange, a shoulder adapted to be engaged by the flange for holding the receptacle in position, a closure for the casing, said closure being provided with a projecting portion adapted to form a closure for the receptacle, and a filler member disposed between the flange on the receptacle and the closure and surrounding the projecting portion on the closure.

6. A fireless cooker comprising a casing, a receptacle within the casing adapted to receive a plurality of vessels, said receptacle comprising inner and outer walls to form a closed space therebetween and from which the air has been exhausted, the inner wall of the said receptacle being shaped to form one or more shoulders intermediate the top and bottom of the receptacle to form supports for superimposed vessels, and means for closing the casing and receptacle.

7. A cooking apparatus embodying a heat retaining casing, a plurality of vessels adapted to be superposed within the casing, headed supports extending from the base of each vessel, there being slots in the next adjacent vessel and having enlarged entrance openings for the heads of the supports and with which slots the supports coöperate for detachably locking adjacent vessels together.

8. A cooking apparatus embodying a heat retaining casing, a plurality of vessels adapted to be superposed within the casing, headed supports extending from the base of each vessel, there being slots in the next adjacent vessel and having enlarged entrance openings for the heads of the supports, said slots being located adjacent the mouth of the vessel and with which slots the supports coöperate for detachably locking the vessels together.

9. A cooking apparatus embodying a heat retaining casing having its inner walls shaped to form a plurality of shoulders spaced above each other, a plurality of vessels adapted to be superposed in the casing, each of said vessels having its upper edge curved outwardly away from the vessel and downwardly to form an arched flange adapted to engage the respective shoulders, each of the vessels also having enlarged projections extending from the bottom thereof, and said flanges being provided with apertures having enlarged entrance portions to receive the enlarged portions of the projections on the next adjacent vessel and reduced portions to receive the reduced portions of the projections for removably securing the vessels to each other.

In testimony whereof I have signed my name to this specification, in the presence of two subscribing witnesses, on this 22nd day of January A. D. 1910.

FOREST V. DETWILER.

Witnesses:
J. H. JOCHUM, Jr.
A. L. SPRINKLE.

---

Copies of this patent may be obtained for five cents each, by addressing the "Commissioner of Patents, Washington, D. C."